United States Patent [19]

Bayley

[11] 4,201,167
[45] May 6, 1980

[54] METHANOL VAPORIZATION AND INJECTION SYSTEM FOR INTERNAL COMBUSTION ENGINE

[76] Inventor: Richard I. Bayley, 1076 Wunderlich Dr., San Jose, Calif. 95129

[21] Appl. No.: 903,076

[22] Filed: May 5, 1978

[51] Int. Cl.² .......................................... F02M 31/00
[52] U.S. Cl. ................................. 123/122 E; 123/133
[58] Field of Search ................ 123/122 E, 133, 3, 1 A

[56] References Cited

U.S. PATENT DOCUMENTS

| | | | |
|---|---|---|---|
| 2,429,932 | 10/1947 | Gehres | 123/139 AW |
| 2,955,582 | 10/1960 | Taylor | 123/139 AW |
| 3,094,976 | 6/1963 | May | 123/139 AW |
| 3,762,378 | 10/1973 | Bitonti | 123/122 E |
| 3,765,382 | 10/1973 | Vandenberg | 123/122 E |

OTHER PUBLICATIONS

"Alcohol Power", Popular Science, Apr. 1975, pp. 68-72.

*Primary Examiner*—Ronald H. Lazarus
*Attorney, Agent, or Firm*—Claude A. S. Hamrick

[57] ABSTRACT

An engine equipped with an alcohol vaporization injection system operates as a four stroke cycle diesel engine that transfers the heat of exiting exhaust gases and cylinder head walls to the fuel the engine runs on alcohol. The alcohol becomes vaporized and its pressure is high enough so that when a valve is opened between the high pressure fuel line and the combustion chamber (when it is at the peak of its compression ratio) enough alcohol will enter the combustion chamber to allow proper combustion.

The overall advantages to this type of alcohol vaporization injection system is that it adds relatively few new mechanisms to the spark ignition four cycle internal combustion engine to enable it to operate as a diesel engine with a high thermal efficiency. This alcohol injection system exploits the engine's need for greater volumes of alcohol caused by the alcohol's relatively low heat of combustion (when compared to gasoline) by using this greater volume of fuel to return greater quantities of heat back to the engine to a much greater degree than other fuels can.

4 Claims, 4 Drawing Figures

U.S. Patent
May 6, 1980
4,201,167
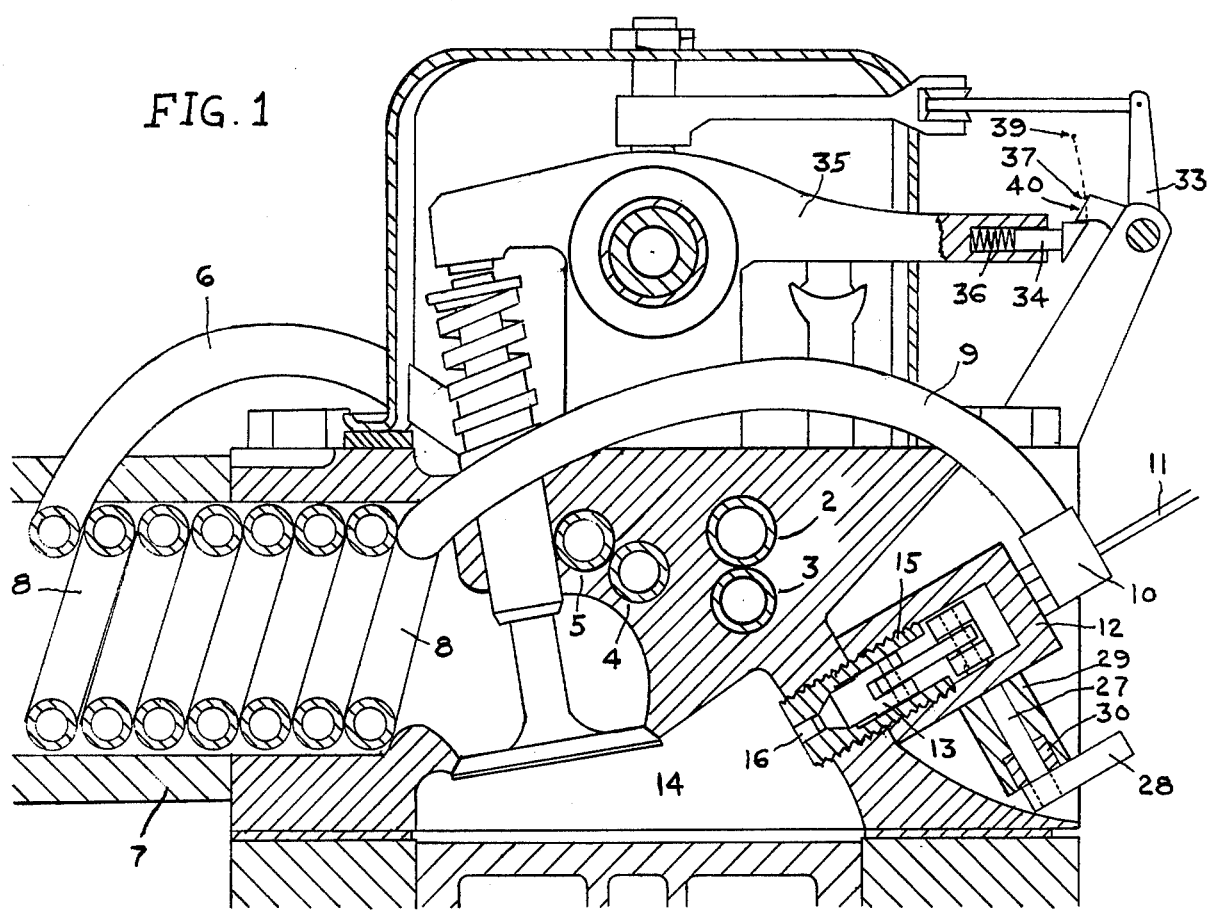
FIG. 1
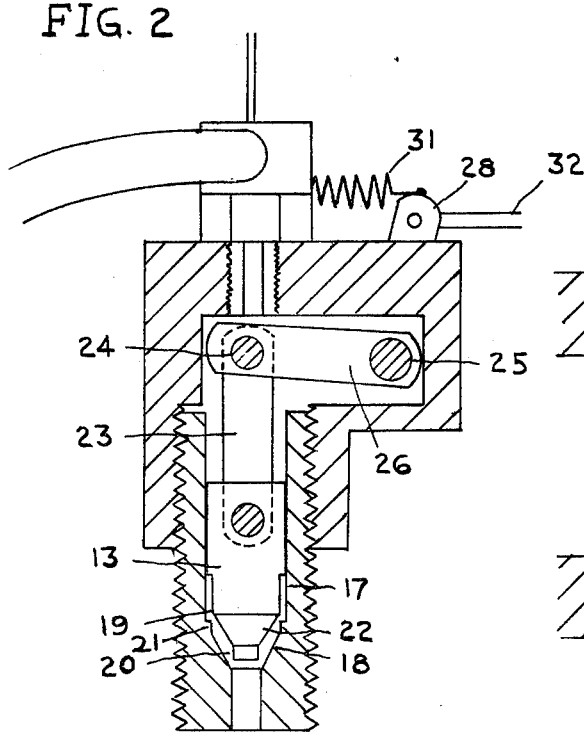
FIG. 2
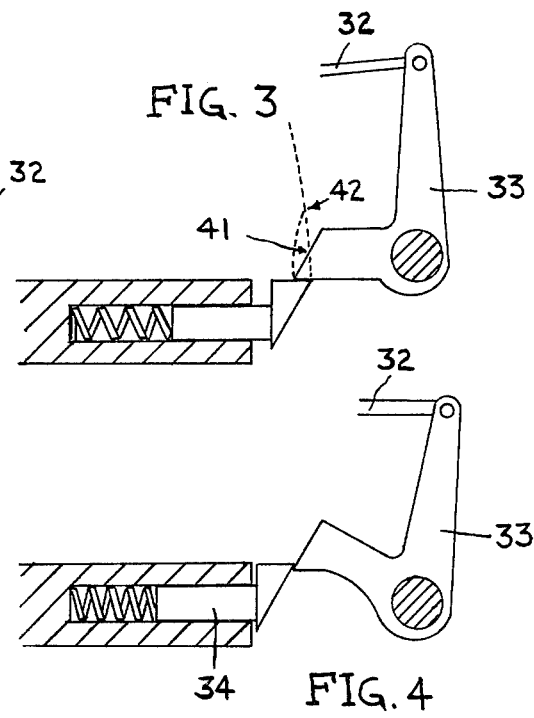
FIG. 3
FIG. 4

METHANOL VAPORIZATION AND INJECTION SYSTEM FOR INTERNAL COMBUSTION ENGINE

BACKGROUND OF THE INVETION

The thermal efficiency of a spark ignition internal combustion engine is usually between 20 and 25 percent, and the compression ignition internal combustion engine (diesel) is usually between 29 to 35 percent. The difference in thermal efficiency is caused by the difference in compression ratios between the two engines. The higher the compression ratio the greater the thermal efficiency, because during the power stroke (of the four stroke cycle) the compressed gases can do more work on the piston when it has a higher expansion ratio. Therefore an internal combustion engine can attain a thermal efficiency of up to 35 percent by increasing the compression ratio.

The thermal energy which is not converted into work (65 percent on a modern diesel engine) is lost to the environment 45 to 55 percent as heat losses and 10 to 20 percent by mechanical and frictional energy losses.

To increase the efficiency of an internal combustion engine with a high compression ratio, it is necessary to reduce the thermal energy losses. The present invention pertains to the object of increasing thermal efficiency by reducing thermal energy losses.

SUMMARY OF THE INVENTION

This invention relates to new and useful improvement in a methanol vaporization and injection system for internal combustion engines. The primary object of this injection system is to recover a large portion of heat lost to the environment and use it for doing useful work, to increase the thermal efficiency of the engine.

Another very important object of the present invention is to provide a mechanically efficient means of injecting the fuel into the high pressure combustion chamber.

Another object of the invention is to provide an internal combustion engine in which methanol is burned cleanly with little atmospheric pollution.

These objects are achieved in the present invention by utilizing the high temperature portions of the cylinder head to vaporize the alcohol to a pressure much greater than the compression pressure in the cylinder. The high pressure and high temperature alcohol can then be allowed to inject into the cylinder 10° prior to the power stroke.

The present engine, having at least two cylinders, controls the injection timing by using a portion of the period in the opening or closing of the exhaust or intake valve of another cylinder to also open the injection valve. The intake or exhaust valve chosen to be used to control the injection timing of another cylinder must be opening or closing 10° prior to the power stroke of the cylinder being injected. Therefore, with a slight modification of the already existing mechanisms which operate the exhaust and intake valves, the valve mechanisms can also be utilized to control the injection timing of another cylinder. The combining of functions that mechanisms perform increases mechanical efficiency in the engine.

The fuel best suited for this type of vaporization and injection system is methanol (methyl alcohol); ethanol is suitable too, but will have a lower thermal efficiency than methanol when used. The reasons for methanol's high suitability in this type of injection system are: (1) it has a low air to fuel ratio—6.46 to 1 (by weight). (2) it has a high heat of vaporization. (3) it's vapor pressure is 823 psi at 425° F. These unique properties of methanol allow a large portion of the lost heat of an engine to be recovered. Other fuels, except for ethanol, do not come close to these properties and cannot be used in this type of injection system.

The cylinder head in an operating internal combustion engine produces a temperature gradient in the head, with the highest temperatures near the combustion chambers and the exhaust.

In the present invention, methanol is circulated through these high temperature regions of the cylinder head where a final temperature of over 650° F. and 800 psi is reached at the expense of waste heat transferring its heat. Alcohol, when at high pressure and temperature, can be monitored to flow into the cylinder that is almost at the peak of its compression stroke. The pressure difference between the alcohol and compressed air (about 600 psi) will give the alcohol vapor a velocity of over 1200 ft/sec in entering the combustion chamber.

In order to initially get the methanol up to its correct operating temperature and pressure, it is most practical to operate the engine as a normal spark ignition gasoline engine until operating temperature is reached. Once the methanol reaches operating temperature and pressure, the engine is switched over to operating on the injection system.

The need to use gasoline initially to start the engine, along with the higher percent of nitrogen oxide pollutants (caused by higher compression ratios), limits the compression ratio of this engine to 10 to 1.

The foregoing, together with other objects and advantages which will become subsequently apparent, reside in the details of construction and operation as more fully hereinafter described and claimed, reference being had to the accompanying darwings forming a part hereof, wherin like numerals refer to like parts throughout, and in which:

FIG. 1 is a schematic cross sectional view through the upper portion of an overhead vlave internal combustion engine equipped with a methanol vaporazation injection system.

FIG. 2 is an enlarged cross sectional view through the methanol vapor injector.

FIG. 3 is an enlarged cross sectional view through the end portion of an extended rocker arm with an injector actuating mechanism.

FIG. 4 same objects as in FIG. 3.

DESCRIPTION OF THE PREFERRED EMBODIMENT

Referring now to the drawing in detail, the four stroke internal combustion engine cylinder head embodying the invention is designated by the reference numeral 1, the rest of the engine, below the cylinder head, is not altered by the invention.

The cylinder head is especially designed to heat liquid alcohol up to 425° F., while maintaining proper exhaust valve cooling.

The alcohol vaporization apparatus begins with high pressure, thermally conductive pipes which are placed along the hottest portions of the temperature gradient in the cylinder head while maintaining structural strength. The high pressure connected pipes 2,3,4, and 5 begin with pipe 2. Liquid alcohol is pumped under high pressure into pipe 2. The alcohol begins to warm there. As it does, the alcohol expands and loops around into the other connected pipes in the order of pipe 3, then 4, then 5. At pipe 5, the now vaporized alcohol is at about 425° F. and 800 psi. The thermally insulated pipe 6 is connected to pipe 5 and leads the heated alcohol out of the cylinder head into the thermally insulated exhaust manifold 7 and connects to pipe 8. Pipe 8 coils along the inside of the exhaust manifold's walls while not interferring with the normal flow of exhaust gases. The high temperature exhaust gases heat the alcohol vapor to about 700° F. The thermally insulated pipe 9 leads the high temperature and pressure alcohol into fuel flow regulator 10. The throttle cable 11 controls the fuel flow regulator 10. The alcohol passes through the regulator and goes inside the fuel injector 12. When valve 13 opens the alcohol attains a velocity of over 1200 ft/sec in entering the combustion chamber 14.

The fuel injector 12, starts and stops the flow of alcohol into the combustion chamber 14, by moving valve 13 up and down one eighth of an inch.

The upper portion of cylindrical casing 15 and the fuel injector 12 screw together, the lower portion of casing 15 screws into the cylinder head. Casing 15 serves as a nozzle 16 for the fuel, a guide 17 for valve 13, and as a valve seat 18. The casing 15 and valve 13 are made out of the same kind of metal so they will both have the same temperature coefficients of expansion. The valve 13 has three different surfaces on it for sealing the injector 12. The two cylindrical surfaces at points 19 and 20 on valve 13 fit exactly into the nozzle 16 and the lower portion of guide 21. The most important seal is at valve seat 22, the high pressure alcohol push valve 13 against valve seat 18 to make a seal. The three seals together allow little leakage of alcohol.

To open valve 13, rod 23 pivots at point 24 and 25 lifting valve 13 upward while following the valve guide 17. Rod 23 is moved by a lever which has three components 26, 27, 28, all three are welded to one another. The lever pivots on its shaft 27, as rod 23 is moved upwards or downwards. The shaft 27 extends outside the fuel injector housing and has a tightly fitting, oiled bushing 29 and teflon seal 30 around the shaft 27 to prevent alcohol leakage to the outside. The outside component of the lever 28 is connected to a spring 31 which along with the alcohol pressure accelerate valve 14 to close after injection period is over.

To move the lever, a cable 32 attaches to lever component 28. The opposite end of cable 32 attaches to a lever near an extended intake or exhaust rocker arm of an adjacent cylinder. Therefore, this engine must contain at least two cylinders.

In FIG. 1. the lever 33 is shown on top of the sliding lever 34. When the rocker arm 35 opens the exhaust valve, it also lifts lever 34 which opens the injector valve 13 of an adjacent cylinder.

The process of opening or closing an exhaust or intake valve takes about 30 degrees turn of the crank shaft of the engine. The fuel injection period must be limited to no more than 10 degrees turn of the crank shaft. Therefore, only a third of the distance that a rocker arm travels in opening or closing the exhaust or intake valve, can be used to open the injection valve 13.

An illustration of how the lever 33 is moved to open valve 13 on an adjacent cylinder is shown in FIG. 1. The rocker arm 35 is shown with the exhaust valve in the closed position with spring 36 keeping the sliding lever 34 under lever 33. When the rocker arm rotates to open the exhaust valve it also moves lever 33. At point 37 the lever 33 and sliding lever 34 lose contact and lever 33 is accelerated back to its original position by valve 13 closing and spring 31. The end of the rocker arm continues to move upward until it reaches point 39, then begins to return to its original position. When sliding lever 34 makes contact with surface 40 on lever 33. The sliding lever 34 moves inward as the rocker arm continues to move downward.

FIG. 4 is a diagram of the rocker arm moving downward just before it reaches its starting position. At the starting position sliding lever 34 moves outward to return to the position of its end lying under the lever 33.

In the case that the injection period does not begin until the rocker arm has traveled halfway, the lever 33 is placed in a different position.

FIG. 3 shows the position of the pivot point on lever 33 is higher than the pivot point on lever 33 in FIG. 1 and FIG. 4 in relation to sliding lever 34. This altered position of the pivot point on lever 33 enables the end of lever 33 to move with the end of sliding lever 34 until the fuel injection period begins 41 and ends 42. In this case the cable 32 does not become taut until the beginning of the injection period 41.

Other similar alteration to the position of lever 33 can be made to get the proper synchronization between fuel injection period and exhaust or intake valve opening or closing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. A four stroke alcohol fueled internal combustion engine comprising:
   an engine block and cylinder head means forming two or more combustion chambers, said cylinder head means being air-cooled and having interior bottom portions capable of operating at a temperature of approximately 400° F.;
   movable compression and expansion members disposed within said chambers, said expansion members being operative to compress working fluid within said chambers and being movable by expansion of fluid within said chambers to mechanically couple energy to an external drive means;
   intake valve means for admitting fresh air into each said chamber;
   exhaust valve means for exiting exhaust gases from each said chamber;
   valve actuating means for actuating said intake valve means and said exhaust valve means;
   thermally insulated exhaust manifold means through which said exhaust gases flow;
   means for vaporizing liquid alcohol input at a high pressure to a vapor pressure of approximately 800 psi and a temperature of approximately 600° F. and including means forming a heat exchanging tubular passageway within said cylinder head means and which originates in the hottest interior portion thereof and then extends into said exhaust manifold where it follows a generally helical path along the inside of the wall thereof;
   alcohol vapor injector means for injecting metered amounts of high pressure, high temperature alcohol vapor into each said combustion chamber near the peak of the chambers compression stroke and including injector actuating means energized by said valve actuating means for opening and closing said vapor injector means; and means forming a thermally insulated high pressure passageway connecting the downstream end of said tubular passageway to said injector means.

2. A four stroke alcohol fueled internal combustion engine as recited in claim 1 wherein said injector means includes a plurality of injector valves each associated with one of said combustion chambers and each being comprised of an outer body having a cylindrical bore, one end of which terminates in a frusto-conical configured valve seat, and a piston member slidably disposed within said bore and having one end configured to sealingly mate with said valve seat, and wherein said injector actuating means includes linkage means mechanically linking each said injector valve to said valve actuating means.

3. A four stroke alcohol fueled internal combustion engine as recited in claim 2 wherein said valve actuating means includes a plurality of rocker arms having extended arm portions, and wherein said injector actuating means further includes spring loaded sliding shafts that fit into end portions of said extended arm portions of said rocker arms and L-shaped pivoting levers positioned next to said extended arm portions so that one end of each pivoting lever rests upon one of said sliding shafts when the associated rocker arm is in its closed valve position and another end of each pivoting lever is connected to one of said piston members so as to actuate the piston member as the associated rocker arm moves from one position to another.

4. A four stroke alcohol fueled internal combustion engine as recited in claim 3 wherein a particular L-shaped pivoting lever operatively engages a rocker arm associated with one of said cylinders and wherein the other end of that L-shaped lever is connected by said linkage means to an injector means associated with another of said cylinders.

* * * * *